D. F. GRAHAM.
BALL BEARING.
APPLICATION FILED NOV. 6, 1918.
1,296,650.
Patented Mar. 11, 1919.
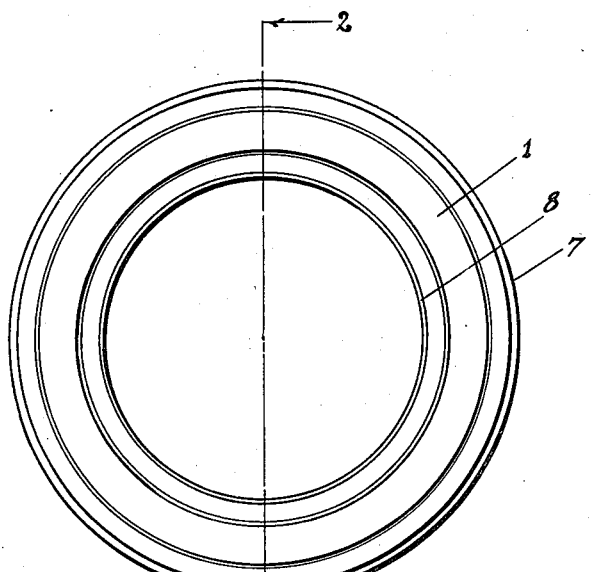
Fig. I.
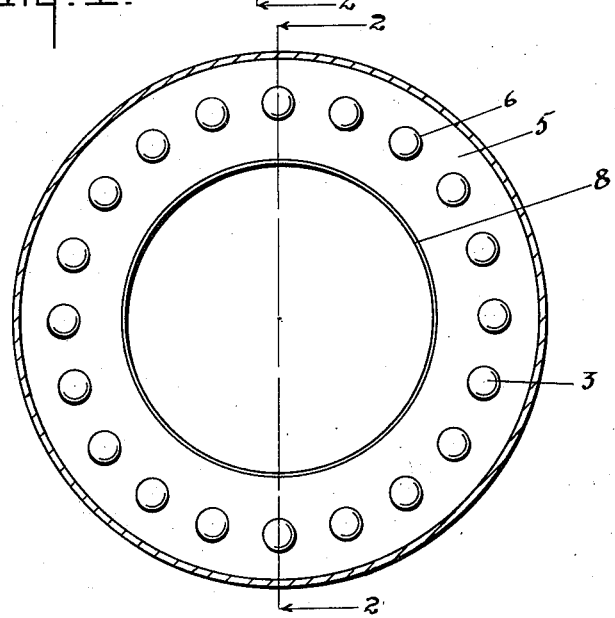
Fig. III.
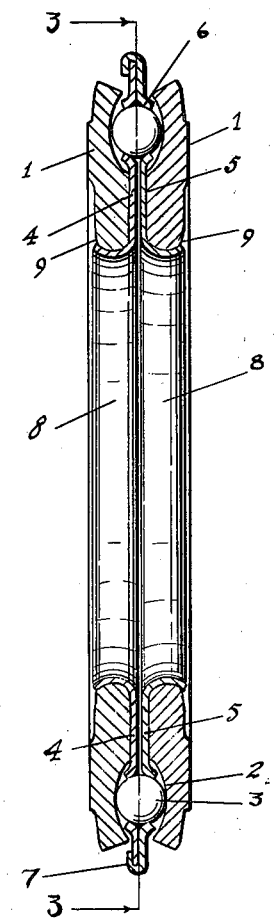
Fig. II.
Inventor
DAVID F. GRAHAM

UNITED STATES PATENT OFFICE.

DAVID F. GRAHAM, OF COUNDERSPORT, PENNSYLVANIA.

BALL-BEARING.

1,296,650.	Specification of Letters Patent.	Patented Mar. 11, 1919.

Application filed November 6, 1918. Serial No. 261,327.

*To all whom it may concern:*

Be it known that I, DAVID F. GRAHAM, a citizen of the United States, residing at Coundersport, Pennsylvania, have invented certain new and useful Improvements in Ball-Bearings, of which the following is a specification.

This invention relates to improvements in ball bearings.

My improvements are particularly designed by me for embodiment in thrust bearings of the type shown in the patent to Carter No. 1,242,767, dated Oct. 9, 1917, although readily adaptable and desirable for use in various structures and relations.

The main objects of this invention are to provide an improved ball bearing assembled as a unit so that it may be handled and installed as such.

Further objects and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is a side view of a structure embodying the features of my invention.

Fig. II is a cross section thereof on a line corresponding to the line 2—2 of Figs. I and III.

Fig. III is a central section through the bearing on a line corresponding to line 3—3 of Fig. II, the bearing balls being shown in full lines.

In the drawing similar reference characters refer to similar parts throughout the several views, and the sectional views are taken looking in the direction of the little arrows at the ends of the section lines.

Referring to the drawing, the annular bearing members 1, 1 are provided with opposed ball races 2 for the bearing balls 3. I provide a ball retainer comprising a pair of dished annular plates 4 and 5 arranged in an opposed relation and having spaced perforations therein flanged to provide ball retaining pockets 6.

The outer edges or peripheries of the ball retaining plates of the embodiment illustrated are seamed together, the edge 7 of the plate 5 being folded over the edge of the plate 4. The inner edges of the plates have curved out-turned flanges 8 embracing the inner curved edges 9 of the bearing members so that they are held in assembled relation, at the same time permitting free relative rotative movement thereof.

The retainer plates are preferably spaced apart as indicated to assist in the circulation and distribution of the lubricant. Due to the fact that lubricant centrifugally flows outward while the retainer or bearing is rotating, it is only able to circulate through the ball pockets on account of the seaming or closing of the outward edges of the plates which secures a very complete and efficient lubrication of the retainer, balls and ball races.

With the parts thus arranged, the bearings may be assembled as units at the factory so that they are very convenient to use or install and in transportation or handling no parts can become lost or disarranged.

I have illustrated and described my improvements in but one embodiment or adaptation thereof as I believe the disclosure made will enable those skilled in the art to which my invention relates to embody or adapt the same as may be desired for the particular use or purposes to which the bearings are to be adapted.

Having thus described my invention, what I claim as new and desire to secure by Letters Patent is:

1. In a bearing, the combination of annular bearing members, bearing balls, and a ball retainer comprising opposed annular plates having their peripheries seamed together and their inner edges flanged outwardly and engaging the inner edges of the bearing members so that they are retained in assembled relation and relative rotation thereof permitted, the plates being perforated to provide retaining pockets for the balls.

2. In a bearing, the combination of bearing members, bearing balls, and a ball retainer comprising connected annular ball engaging plates having their inner edges flanged to engage the inner edges of the bearing members so that they are retained in assembled relation and relative rotation thereof permitted.

3. In a bearing, the combination of annular bearing members, bearing balls, and a ball retainer comprising annular plates perforated to provide retaining pockets for the balls secured together at their outer edges and having their inner edges engaging the inner edges of the bearing members so that relative rotation is permitted and they are retained in assembled relation.

4. In a bearing, the combination of annular bearing members, bearing balls, and an annular ball retainer disposed between said bearing members with its inner edge engaging the inner edges of the bearing members so that relative rotation thereof is permitted and they are retained in assembled relation.

5. In a bearing, the combination of bearing members, bearing balls, and a ball retainer connected to the bearing members so that relative rotation thereof is permitted and they are retained in assembled relation.

In witness whereof, I have hereunto set my hand and seal in the presence of two witnesses.

DAVID F. GRAHAM. [L. S.]

Witnesses:
J. R. COLLINS,
F. A. RAYMOND.